June 24, 1947.  W. H. DU BOIS  2,423,011
DISK BRAKE
Filed April 17, 1944  2 Sheets-Sheet 1

INVENTOR
WILLIAM H. DuBois
BY
ATTORNEY

June 24, 1947.  W. H. DU BOIS  2,423,011
DISK BRAKE
Filed April 17, 1944  2 Sheets-Sheet 2

INVENTOR
WILLIAM H. DuBOIS
BY
ATTORNEY

Patented June 24, 1947

2,423,011

UNITED STATES PATENT OFFICE 2,423,011

DISK BRAKE

William H. Du Bois, South Bend, Ind., assignor to Bendix Aviation Corporation, South Bend, Ind., a corporation of Delaware Application April 17, 1944, Serial No. 531,436

10 Claims. (Cl. 188—72)

This invention relates to disk brakes, and particularly to self-energizing disk brakes, wherein, during braking, part of the retarding force of the brake rotor or rotors is translated into force acting axially in cooperation with the manually applied force to compress the disks and thereby create braking friction.

An object of the present invention is to provide improved means for obtaining self-energization in a disk brake.

A further object of the present invention is to provide an improved disk brake incorporating a self-energization feature in a manner which is ideally suited to a practicable disk brake structure.

A still further object if the present invention is to incorporate self-energization into a disk brake by means of a less complicated structure than has heretofore been used, requiring no added parts to obtain the self-energization.

Other objects and advantages of the present invention will become apparent during the course of the following description, reference being had therein to the accompanying drawings, in which.

The principles of my invention are applicable to any disk brake, regardless of its particular structure. For purposes of illustration, I have shown the invention incorporated in a disk brake corresponding substantially to that shown in Figures 1 and 2 of my application Serial No. 449,722, filed July 4, 1942.

Figure 1:
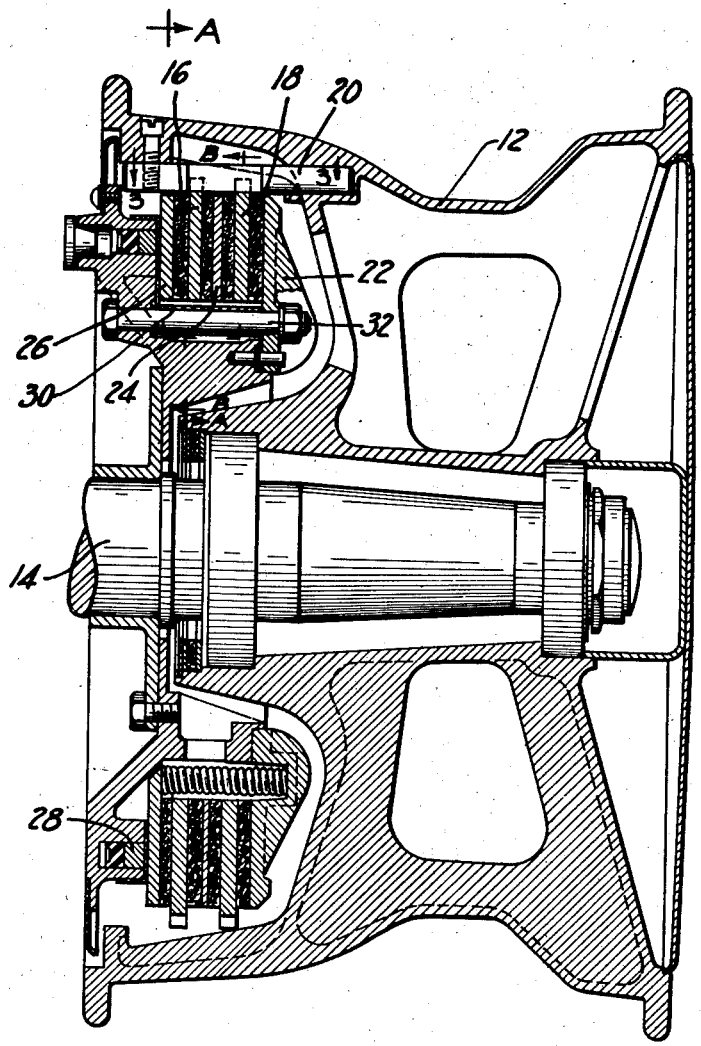
Figure 1 is a vertical sectional view of a wheel, brake and axle assembly in which my invention may be incorporated.
Figure 2:
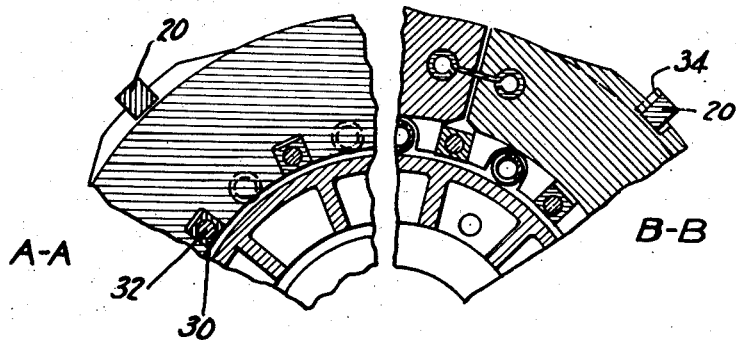
Figure 2 is a composite view showing sections taken on the lines A—A and B—B of Figure 1.

In general, the assembly shown in Figure 1 of the present application comprises a wheel 12 which is rotatable about an axle 14. The disk brake comprises one or more rotors which rotate with the wheel, and one or more stators which are prevented from rotation by suitable means, in this case by being anchored through intermediate members on the axle.

The number of rotors or rotating disks which are included in the brake assembly is not material to the invention, the number depending entirely on the requirements as to brake effectiveness. In the present case, I have shown two brake rotors 16 and 18, which are driven by one or more rotor drive members or keys 20 secured to the wheel 12. The rotors 16 and 18 may be, as shown, composed of a plurality of segments, as described and claimed in my aforementioned application Serial No. 449,722. In such a case, it is preferable to have a driving key 20 for each segment. However, it will be appreciated that the number of driving keys is not directly related to the principles of the invention.

Although the number of brake stators may be chosen to conform to brake requirements, I have illustrated three stator or non-rotating disks 22, 24 and 26, the rotor disk 18 being between stator disks 22 and 24, and the rotor disk 16 being between stator disks 24 and 26. As explained in my aforementioned earlier filed application, disk 22 is incapable of either rotative or axial movement. Stator disks 24 and 26, which being prevented from rotation at all times, are able to move axially under the influence of fluid pressure exerted through the annular piston 28. One or more axially extending anchor sleeves 30 mounted on bolts 32 are adapted to anchor the stator disks 24 and 26 to prevent them from rotating, while permitting them to move axially when braking pressure is applied.

The rotor driving key or keys 20 are also adapted to permit axial movement of the rotors 16 and 18 when braking pressure is applied. Obviously, at least one member, and almost invariably at least two members of a disk brake assembly must be capable of axial movement under the influence of brake applying pressure. The use of axially extending torque-taking or torque-transmitting members such as the driving keys 20 or the anchor sleeves 30, which permit relatively free axial movement of the disks, insures efficient and satisfactory operation of a disk brake, and is particularly important where a plurality of rotor disks and a plurality of stator disks are combined in a single brake assembly.

Figure 3:
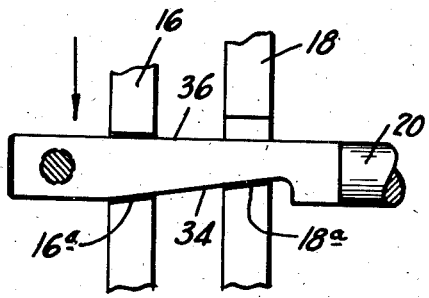
Figure 3 is an enlarged plan view of one of the rotor keys of Figure 1 which may be considered as a section taken on the line 3—3 of Figure 1.

I have provided a particularly simple and yet efficient arrangement which causes the disk brake to have a certain self-energizing action. Referring particularly to Figure 3, it will be seen that the rotor drive key 20 which in general extends substantially axially (or in other words parallel to the axis of the axle 14 and wheel 12) has a forward or driving surface 34 which is inclined with respect to a line parallel to the aforesaid axis of the brake assembly. Assuming that the direction of rotation of the wheel is indicated by the arrow in Figure 3, the inclined surface 34 of the rotor drive key is in direct driving contact with the edges 16a and 18a of the rotors 16 and 18 respectively, the edges 16a and 18a being preferably inclined as shown to have the maximum bearing surface against the inclined surface 34 of the drive key. The inclination of the surface 34 is such that axial movement of the rotor disks 16 and 18 is accomplished by relative circumferential movement between the rotor disks on the one hand and the drive key 20 on the other hand. Simultaneously the disks 16 and 18 move axially inward due to brake applying pressure, or to the right as seen in Figs. 1 and 3, and the rotor drive key 20 moves circumferentially forward with respect to the rotor disks (the arrow in Fig. 3 indicates "forward" movement.)

With the above construction, as the brakes are applied, a certain part or component of the torque being exerted between the rotor drive key 20 and the rotor disks acts in an axial direction to increase the compressive force acting on the disks of the brake assembly, adding to the force exerted by pressure against piston 28, thereby increasing the effectiveness of the brake and stopping the wheel more quickly than would otherwise be the case.

It is apparent that the only change required to incorporate this self-energization in the disk brake shown is the machining of the inclined surface 34 on each rotor drive key 20. No new parts are added to the assembly and no complications are introduced into the manufacture of the brake.

Since the brake illustrated is primarily intended for use on aircraft, it was not considered necessary to provide for self-energization in both directions of wheel rotation. Therefore the rear surface 36 of the rotor drive key 20 which drives the rotors 16 and 18 in the rearward direction of rotation (opposite to that indicated by the arrow in Fig. 3) is not inclined as is the surface 34.

Although a particular embodiment of my invention has been described, it will be understood by those skilled in the art that the object of the invention may be attained by the use of constructions different in certain respects from that disclosed without departing from the underlying principles of the invention. I therefore desire by the following claims to include within the scope of my invention all such variations and modifications by which substantially the results of my invention may be obtained through the use of substantially the same or equivalent means.

I claim:

1. In a disk brake having a rotating disk, a driving key having a surface inclined with respect to a line parallel to the axis of the disk and in driving contact with the disk, said disk being adapted to slide along the driving surface of said key.

2. In a disk brake having a rotating disk, a driving key having a surface inclined with respect to a line parallel to the axis of the disk and in driving contact with the disk, said disk being adapted to slide along the driving surface of said key, the inclination of said driving surface being such that the disk simultaneously moves axially toward brake-engaged position and circumferentially toward the driving key.

3. In a disk brake having a plurality of rotating disks, a driving key having a surface inclined with respect to a line parallel to the axis of the disks and in driving contact with all of said rotating disks, said disks being adapted to slide along the driving surface of said key, the inclination of said driving surface being such that the disks simultaneously move axially toward brake-engaged position and circumferentially toward the driving key.

4. In a structure including a rotating wheel and a non-rotating member, a disk brake comprising a stator disk associated with the non-rotating member, an axially movable rotor disk adapted to engage said stator disk, a plurality of circumferentially spaced substantially axially extending driving keys supported on said wheel near the periphery thereof and in driving contact with the rotor disk, the surfaces of the several driving keys which contact the rotor disk being so inclined with respect to the axis of the disk that rotation of the wheel while the stator and rotor disks are engaged tends to move said disks into firmer engagement, and means for initially moving said disks into engagement.

5. In a structure including a rotating wheel and a non-rotating member, a disk brake comprising a plurality of stator disks associated with the non-rotating member, a plurality of rotor disks engageable with said stator disks to hinder rotation of the wheel, said rotor disks and all but one of said stator disks being axially movable to permit engagement at the same time of all of the disks, a plurality of circumferentially spaced substantially axially extending driving keys supported on said wheel near the periphery thereof, each of said driving keys being in driving contact with all of said rotor disks, the surfaces of the several driving keys which contact the rotor disks being so inclined with respect to the axis of the disks that rotation of the wheel while the stator and rotor disks are engaged tends to move said disks into firmer engagement, and means under the control of the operator for initially moving said disks into engagement.

6. In a structure including a rotating wheel and a non-rotating member, a disk brake comprising a stator disk associated with the non-rotating member, an axially movable rotor disk adapted to engage said stator disk, said rotor disk having a plurality of circumferentially spaced notches in the periphery thereof, a plurality of circumferentially spaced substantially axially extending driving keys supported on said wheel and extending through said notches to drive the rotor disk, the surfaces of the several driving keys which contact the rotor disk being so inclined with respect to the axis of the disk that rotation of the wheel while the stator and rotor disks are engaged tends to move said disks into firmer engagement, and means for initially moving said disks into engagement.

7. In a structure including a rotating wheel and a non-rotating member, a disk brake comprising a stator disk associated with the non-rotating member, an axially movable rotor disk adapted to engage said stator disk, said rotor disk having a notch in the periphery thereof, a driving key supported on said wheel and extending through said notch to drive the rotor disk, the surface of said driving key which contacts the rotor disk being so inclined with respect to the axis of the disk that rotation of the wheel while the stator and rotor disks are engaged tends to slide said rotor axially and thereby moves said disks into firmer engagement, and means for initially moving said disks into engagement.

8. In a structure including a rotating wheel and non-rotating member, a disk brake comprising a plurality of stator disks associated with the non-rotating member, a plurality of rotor disks engageable with said stator disks to hinder rotation of the wheel, said rotor disks and all but one of said stator disks being axially movable to permit engagement at the same time of all of the disks, said rotor disks each having a plurality of circumferentially spaced notches in the periphery thereof, a plurality of circumferentially spaced substantially axially extending driving keys supported on said wheel and extending through said notches to drive the rotor disks, each of said driving keys being in driving contact with all of said rotor disks, the surfaces of the several driving keys which contact the rotor disks being so inclined with respect to the axis of the disks that rotation of the wheel while the stator and rotor disks are engaged tends to move said disks into firmer engagement, and means under the control of the operator for initially moving said disks into engagement.

9. For use with a rotating wheel and a non-rotating member, a disk brake comprising a stator disk associated with the non-rotating member, an axially movable rotor disk adapted to engage said stator disk, and a plurality of circumferentially spaced substantially axially extending driving keys supported on said wheel near the periphery thereof and in driving contact with the rotor disk, the surfaces of the several driving keys which contact the rotor disk during forward rotation being so inclined with respect to the axis of the disk that forward rotation of the wheel while the stator and rotor disks are engaged tends to move said disks into firmer engagement, the surfaces of the several driving keys which contact the rotor disk during rearward rotation being substantially parallel to the axis of the disk or so inclined with respect to said axis that rearward rotation of the wheel while the stator and rotor disks are engaged does not deenergize the frictional engagement of said disks.

10. For use with a rotating wheel and a non-rotating member, a disk brake comprising a stator disk associated with the non-rotating member, an axially movable rotor disk adapted to engage said stator disk, said rotor disk having a notch in the periphery thereof, a driving key supported on said wheel and extending through said notch to drive the rotor disk, the surface of said driving key which contacts the rotor disk during forward rotation being so inclined with respect to the axis of the disk that forward rotation of the wheel while the stator and rotor disks are engaged tends to slide said rotor disk axially and thereby move said disks into firmer engagement, the surface of said driving key which contacts the rotor disk during rearward rotation being so formed that rearward rotation of the wheel while the stator and rotor disks are engaged does not deenergize the frictional engagement of the disks, and means for initially moving said disks into engagement.

WILLIAM H. DU BOIS.

REFERENCES CITED

The following references are of record in the file of this patent:

UNITED STATES PATENTS

| Number | Name | Date |
|---|---|---|
| 1,718,021 | Andrews | June 18, 1929 |
| 2,071,788 | Gillett | Feb. 23, 1937 |
| 2,303,710 | Sinclair | Dec. 1, 1942 |
| 2,293,213 | Osborn | Aug. 18, 1942 |